(12) United States Patent
Yang et al.

(10) Patent No.: US 8,152,353 B2
(45) Date of Patent: Apr. 10, 2012

(54) SURFACE EMISSION APPARATUS, LIGHT GUIDE, AND METHOD OF MANUFACTURING LIGHT GUIDE

(75) Inventors: Ying Bao Yang, Kanagawa (JP); Masaru Higuchi, Tokyo (JP); Tsutomu Tanaka, Kanagawa (JP); Kazunori Yamaguchi, Kanagawa (JP); Masumitsu Ino, Kanagawa (JP)

(73) Assignee: Sony Corporation, Tokyo (JP)

( * ) Notice: Subject to any disclaimer, the term of this patent is extended or adjusted under 35 U.S.C. 154(b) by 479 days.

(21) Appl. No.: 12/323,045

(22) Filed: Nov. 25, 2008

(65) Prior Publication Data
US 2009/0147353 A1      Jun. 11, 2009

(30) Foreign Application Priority Data

Dec. 6, 2007   (JP) .................... 2007-316112

(51) Int. Cl.
*F21V 7/04*      (2006.01)
*F21V 9/16*      (2006.01)
(52) U.S. Cl. .................... 362/625; 362/84; 362/615
(58) Field of Classification Search .................... 362/84, 362/612, 613, 615, 623–626; 250/227.11, 250/227.31, 227.32
See application file for complete search history.

(56) References Cited

U.S. PATENT DOCUMENTS

| 6,419,372 | B1 * | 7/2002 | Shaw et al. | 362/231 |
| 6,536,933 | B1 * | 3/2003 | Gettemy et al. | 362/84 |
| 7,036,946 | B1 * | 5/2006 | Mosier | 362/27 |
| 7,287,894 | B2 * | 10/2007 | Chen | 362/621 |
| 7,481,562 | B2 * | 1/2009 | Chua et al. | 362/612 |
| 7,527,416 | B2 * | 5/2009 | Lin | 362/626 |
| 2009/0034230 | A1 * | 2/2009 | Lim et al. | 362/84 |

FOREIGN PATENT DOCUMENTS

JP       2005-275644       10/2005

* cited by examiner

*Primary Examiner* — Alan Cariaso
(74) *Attorney, Agent, or Firm* — Robert J. Depke; Rockey, Depke & Lyons, LLC

(57) ABSTRACT

A surface emission apparatus includes a first light source for emitting invisible light rays; a second light source for emitting visible light rays; a light guide having a light entrance surface for entering therethrough into the light guide the invisible light rays emitted from the first light source and the visible light rays emitted from the second light source, and a light exit surface for emitting the invisible light rays and the visible light rays therethrough out of the light guide; and a plurality of optical devices disposed on a surface of the light guide which confronts the light exit surface, for scattering more of the invisible light rays than the visible light rays.

20 Claims, 6 Drawing Sheets

SURFACE EMISSION APPARATUS, LIGHT GUIDE, AND METHOD OF MANUFACTURING LIGHT GUIDE

CROSS REFERENCES TO RELATED APPLICATIONS

The present invention contains subject matter related to Japanese Patent Application JP 2007-316112 filed in the Japan Patent Office on Dec. 6, 2007, the entire contents of which being incorporated herein by reference.

BACKGROUND OF THE INVENTION

1. Field of the Invention

The present invention relates to a surface emission apparatus, a light guide, and a method of manufacturing a light guide, and more particularly to a surface emission apparatus having an optical device for diffusing light, a light guide, and a method of manufacturing a light guide.

2. Description of the Related Art

Display apparatus such as liquid crystal display apparatus, organic Electro Luminescence (EL) display apparatus, or the like are advantageous in that they are thin and lightweight, and have a low power requirement.

Liquid crystal display apparatus have a display panel in the form of a liquid crystal panel including a liquid crystal layer sealed between a pair of substrates. The liquid crystal panel may be of the transmissive type which modulates and transmits therethrough illuminating light that is emitted from a surface emission apparatus such as a backlight disposed behind the liquid crystal panel. The modulated illuminating light displays an image on the front surface of the liquid crystal panel.

There has been proposed a liquid crystal panel incorporating light detecting devices that function as position sensors in addition to TFTs as pixel switching devices.

The proposed liquid crystal panel operates as follows: Visible light rays from a detectable element such as a user's finger or a stylus pen held in contact with the front surface of the liquid crystal panel are detected by the light detecting devices. Based on the date of the light detected by the light detecting devices, the position where the detectable element touches the front surface of the liquid crystal panel is identified. The liquid crystal device itself or an electronic equipment connected to the liquid crystal device performs a certain process based on the identified position.

The data of the detected light produced by the light detecting devices for identifying the position of the detectable element possibly contain a lot of noise because of visible light rays included in ambient light. If the liquid crystal panel displays a black image, then the light detecting devices which are mounted on a TFT array substrate find it difficult to detect visible light rays emitted from the detectable element. In such a case, the position of the detectable element may not accurately be detected.

To eliminate the above drawback, there has been proposed a technology for emitting invisible light rays, rather than visible light rays, such as an infrared radiation, from a surface emission apparatus (see, for example, Japanese Patent Laid-open No. 2005-275644).

With respect to light sources of visible light rays and light sources of invisible light rays, the number of lights is determined by the luminance of the display panel, power consumption limitations, or the sensitivity of the light detecting devices. Generally, the number of lights of light sources of invisible light rays is smaller than the number of lights of light sources of visible light rays.

SUMMARY OF THE INVENTION

The amount of invisible light rays applied from a light source to a light guide is of a required level as a whole. However, since the number of lights of light sources of invisible light rays is relatively small, the light emitting surface of the light guide has an area where the intensity of emitted invisible light rays is higher and an area where the intensity of emitted invisible light rays is lower, resulting in intensity irregularities of invisible light rays emitted from the light emitting surface of the light guide.

It is desirable to provide a surface emission apparatus which is capable of emitting invisible light rays from a light emitting surface with increased intensity uniformity, a light guide, and a method of manufacturing a light guide.

According to an embodiment of the present invention, there is provided a surface emission apparatus including a first light source for emitting invisible light rays, a second light source for emitting visible light rays, and a light guide having a light entrance surface for entering therethrough into the light guide the invisible light rays emitted from the first light source and the visible light rays emitted from the second light source, and a light exit surface for emitting the invisible light rays and the visible light rays therethrough out of the light guide. The surface emission apparatus further includes a plurality of optical devices disposed on a surface of the light guide which confronts the light exit surface, for scattering more of the invisible light rays than the visible light rays.

In the surface emission apparatus, the optical devices are disposed in positions for correcting variations in the intensity of the invisible light rays which are emitted out of the light guide through the light exit surface.

According to another embodiment of the present invention, there is also provided a light guide including a light entrance surface for entering therethrough invisible light rays and visible light rays emitted from respective light sources, a light exit surface for emitting the invisible light rays and the visible light rays entering from the light entrance surface, therethrough out of the light guide, and a plurality of optical devices disposed on a surface which confronts the light exit surface, for scattering more of the invisible light rays than the visible light rays.

In the light guide, the optical devices for scattering more of the invisible light rays than the visible lightrays are disposed in positions for correcting variations in the intensity of the invisible light rays which are emitted out of the light guide through the light exit surface.

According to still another embodiment of the present invention, there is further provided a method of manufacturing a light guide having a light entrance surface for entering therethrough invisible light rays and visible light rays emitted from respective light sources, and a light exit surface for emitting the invisible light rays and the visible light rays therethrough out of the light guide. The method includes the steps of forming grooves for scattering the visible light rays in a surface confronting the light exit surface by injection molding, and forming dots containing a pigment for scattering the invisible light rays and absorbing the visible light rays on the surface confronting the light exit surface by printing.

In the above method, the grooves for scattering the visible light rays are formed in the surface confronting the light exit surface by injection molding, and the dots containing a pigment for scattering the invisible light rays and absorbing the visible light rays are formed on the surface confronting the light exit surface by printing.

According to the present embodiment, the surface emission apparatus, the light guide, and the method of manufacturing a light guide are capable of emitting invisible light rays from a light emitting surface with increased intensity uniformity.

The above and other features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

1st Embodiment

Structure of a Surface Emission Apparatus

Figure 1:
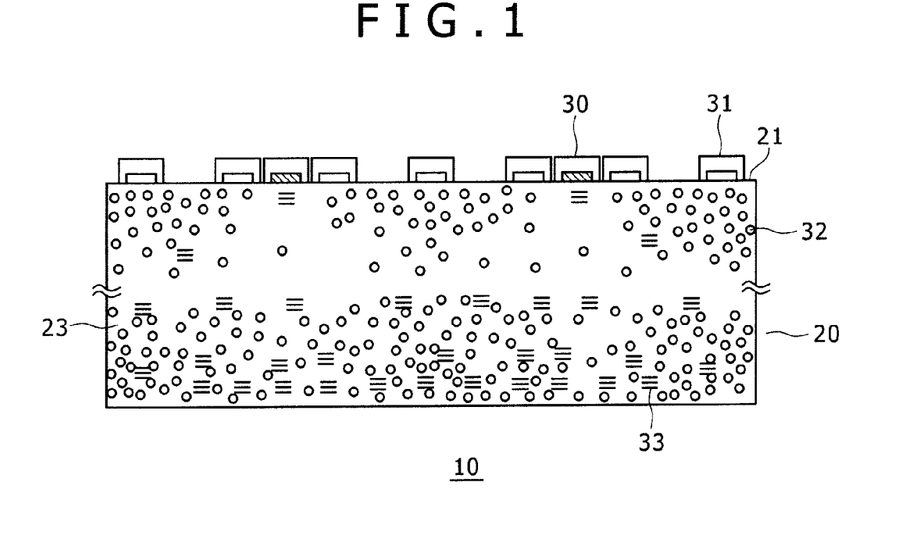
FIG. 1 is a bottom view of a surface emission apparatus according to an embodiment of the present invention.
Figure 2:
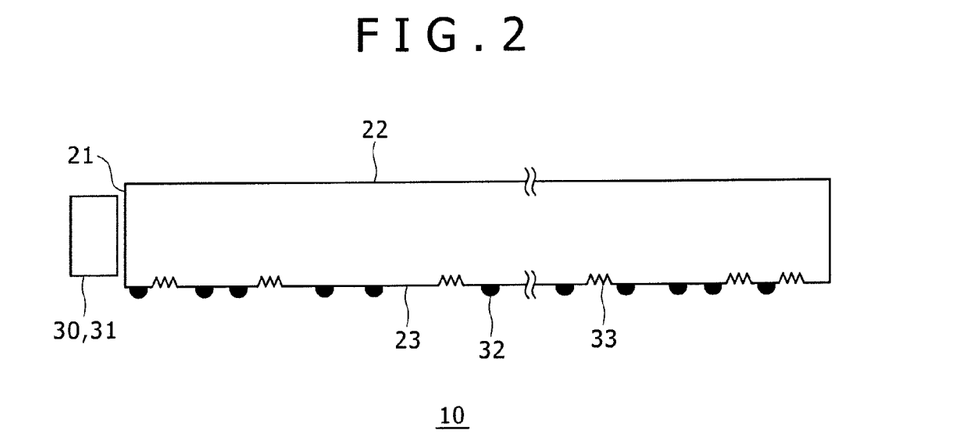
FIG. 2 is a side elevational view of the surface emission apparatus according to the first embodiment.

FIG. 1 is a bottom view of a surface emission apparatus according to a first embodiment of the present invention, and FIG. 2 is a side elevational view of the surface emission apparatus according to the first embodiment.

As shown in FIG. 1, a surface emission apparatus 10 according to a first embodiment of the present invention includes a light guide 20, a plurality of invisible light ray emission sources 30, and a plurality of visible light ray emission sources 31. The light guide 20 has a plurality of dots 32 and a plurality of grooves 33.

The light guide 20 has a side surface serving as a light entrance surface 21 through which light rays emitted from the emission sources 30, 31 enter the light guide 20. The invisible light ray emission sources 30 and the visible light ray emission sources 31 are disposed adjacent to the light entrance surface 21. The light guide 20 has a principal surface serving as a light exit surface 22 from which light rays entering from the light entrance surface 21 exit out of the light guide 20. The light guide 20 also has an optical device bearing surface 23 extending parallel to and confronting the light exit surface 22. The dots 32 are disposed on the optical device bearing surface 23 for scattering invisible light rays IL (see FIG. 5) that enter the light guide 20. The grooves 33 are defined in the optical device bearing surface 23 for scattering visible light rays VL (see FIG. 5) that enter the light guide 20.

The above components of the surface emission apparatus 10 will be described in detail below.

The light guide 20 is made of a transparent plastic material such as acrylic resin or polycarbonate resin, for example, which is excellent for its transparency, mechanical strength, price, and formability.

As shown in FIG. 2, the light guide 20 has wider parallel confronting surfaces serving as principal surfaces, one of which serves as the light entrance surface 21 and the other as the light exit surface 22. The light guide 20 has the light entrance surface 21 as its side surface through which the invisible light rays IL and the visible light rays VL enter the light guide 20.

As shown in FIG. 2, the light entrance surface 21 is a surface through which the invisible light rays IL and the visible light rays VL enter the light guide 20. For example, as shown in FIG. 2, the light entrance surface 21 is a left side surface of the light guide 20. However, the light entrance surface 21 may be a rear surface of the light guide 20, i.e., a lower surface of the light guide 20 shown in FIG. 2, or a front surface of the light guide 20, i.e., an upper surface of the light guide 20 shown in FIG. 2. The invisible light ray emission sources 30 and the visible light ray emission sources 31 are disposed adjacent to the light entrance surface 21 in an array parallel to the light entrance surface 21.

The light exit surface 22 is a surface through which the invisible light rays IL and the visible light rays VL entering from the light entrance surface 21 travel out of the light guide 20. Dots or grooves for scattering light may be disposed on the light exit surface 22.

The dots 32 and the grooves 33, which are optical devices for scattering the invisible light rays IL and the visible light rays VL in the light guide 20, are disposed on and defined in the optical device bearing surface 23. Specifically, as shown in FIG. 2, the dots 32 in the form of outwardly projecting convexities are disposed on the optical device bearing surface 23 so as to project outwardly from the light guide 20. The grooves 33 are defined in the optical device bearing surface 23 so as to extend inwardly into the light guide 20.

The invisible light ray emission sources 30 emit the invisible light rays IL. As shown in FIG. 1, the invisible light ray emission sources 30, which are disposed adjacent to the light entrance surface 21, apply the invisible light rays IL to the light entrance surface 21 of the light guide 20. Each of the invisible light ray emission sources 30 includes an LED for emitting an infrared radiation. Alternatively, each of the invisible light ray emission sources 30 may include an EL or an LED for emitting a ultraviolet radiation. Each of the invisible light ray emission sources 30 may be combined with a lens on its emission source surface for emitting light in a wide range. The number of invisible light ray emission sources 30 is calculated based on the intensity of visible light rays that exit from the light exit surface 22 and the area of the light exit surface 22. For example, if the light exit surface 22 has a wide area, many invisible light ray emission sources 30 are required.

If the invisible light rays IL are an infrared radiation, the infrared radiation that exits from the light exit surface 22 is used to detect the position of a detectable element such as a user's finger or a stylus pen on a liquid crystal display apparatus (hereinafter referred to as "LCD apparatus") including the surface emission apparatus 10 according to the present embodiment. For example, according to the present embodiment, two invisible light ray emission sources 30 for emitting an infrared radiation for detecting the position of a detectable element are disposed over the light entrance surface 21 of the light guide 20.

The visible light ray emission sources 31 emit the visible light rays VL. As shown in FIG. 1, the visible light ray emission sources 31, which are disposed adjacent to the light entrance surface 21, apply the visible light rays VL to the light entrance surface 21 of the light guide 20. Each of the visible light ray emission sources 31 includes an LED. Alternatively, each of the visible light ray emission sources 31 may include an EL or an LED. Each of the visible light ray emission sources 31 may be combined with a lens on its emission source surface for emitting light in a wide range. The number of visible light ray emission sources 31 is calculated based on the intensity of visible light rays that exit from the light exit surface 22 and the area of the light exit surface 22. For example, if the light exit surface 22 has a wide area, many visible light ray emission sources 31 are required.

The invisible light ray emission sources 30 and the visible light ray emission sources 31 can electrically independently be controlled by a controller, not shown. For example, if the intensity of the visible light rays VL applied to the light guide 20 is to be reduced, the controller can control only the visible light ray emission sources 31 to reduce the intensity of the visible light rays VL to be emitted thereby.

The visible light rays VL that exit from the light exit surface 22 is used to illuminate the display panel of the LCD apparatus including the surface emission apparatus 10 according to the present embodiment. For example, seven visible light ray emission sources 31 for illuminating the display panel are disposed over the light entrance surface 21 of the light guide 20.

The dots 32 represent optical devices according to the embodiment of the present invention. The dots 32 serve to scatter more of the invisible light rays IL that have reached the dots 32 than the visible light rays VL. The dots 32 contain a pigment for reflecting the invisible light rays IL, and include a plurality of convex dots.

Figure 3:
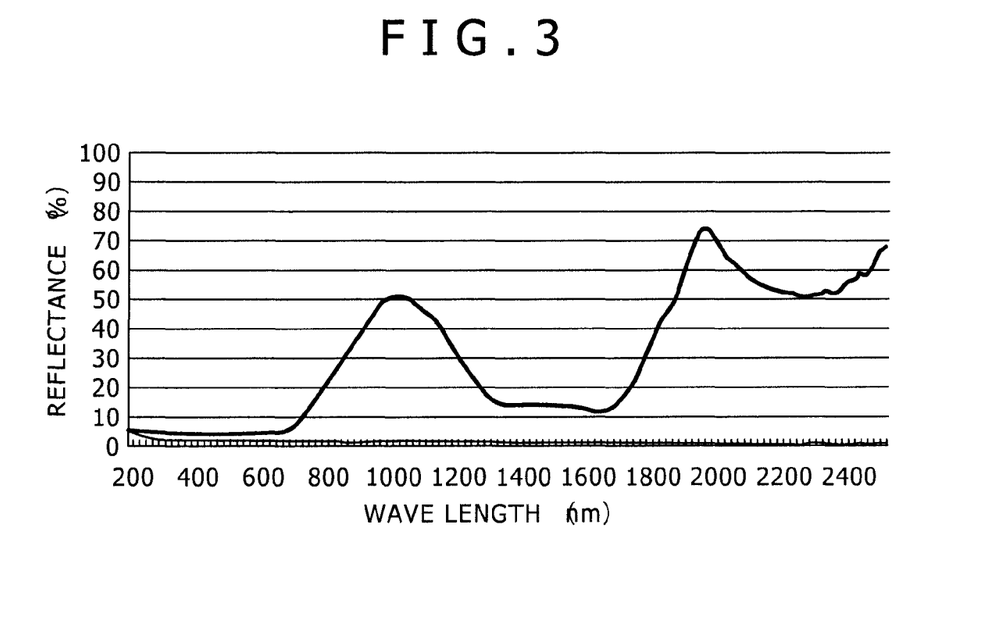
FIG. 3 is a diagram showing the reflection characteristics of a pigment containing in dots in the case where invisible light rays IL are an infrared radiation according to the first embodiment.

FIG. 3 is a diagram showing the reflection characteristics of the pigment contained in the dots 32 in the case where the invisible light rays IL are an infrared radiation according to the present embodiment.

According to the present embodiment, the dots 32 have such characteristics that they scatter invisible light rays IL, but they do not substantially scatter visible light rays VL. For example, if the invisible light rays IL are an infrared radiation, then the pigment contained in the dots 32 should preferably be AB820 BLACK manufactured by Kawamura Chemical Co., Ltd. AB820 BLACK has a reflectance that is about 50% for the wavelength (850 nm) of the infrared radiation and about 5% or less for the wavelengths of a visible light range, which is lower than the infrared radiation. Therefore, the dots 32 which contain the pigment AB820 BLACK scatter the infrared radiation and absorb the visible light rays VL.

As shown in FIG. 2, the dots 32 as viewed in the side elevation of the surface emission apparatus may be of a planar shape that can easily be manufactured insofar as they have a certain area. The dots 32 may have a height equal or greater than the wavelength of the infrared radiation. The height of 8 μm or greater is suitable for scattering the infrared radiation.

The dots 32 are disposed on the optical device bearing surface 23 for causing the invisible light rays IL entering from the light entrance surface 21 to exit uniformly from the entire light exit surface 22. For example, the positions, number, and density of the dots 32 on the optical device bearing surface 23 are calculated based on the intensity of the invisible light rays IL that are emitted from the light exit surface 22. The dots 32 are disposed in the positions for correcting variations in the intensity of the invisible light rays IL emitted from the light exit surface 22.

Specifically, according to the present embodiment, as shown in FIG. 1, two invisible light ray emission sources 30 for emitting an infrared radiation as invisible light rays are disposed over the light entrance surface 21 of the light guide 20, and seven visible light ray emission sources 31 for emitting visible light rays are disposed over the light entrance surface 21 of the light guide 20. In a region of the optical device bearing surface 23 which is remoter from the invisible light ray emission sources 30, the density of the dots 32 is made higher as the intensity of the infrared radiation reaching the region is smaller and the intensity of the infrared radiation emitted from a region of the light exit surface 22 that faces the above region of the optical device bearing surface 23 is smaller. On the other hand, in a region of the optical device bearing surface 23 which is closer to the front faces of the visible light ray emission sources 31, the density of the dots 32 is made lower as the intensity of the infrared radiation reaching the region is greater and the intensity of the infrared radiation emitted from a region of the light exit surface 22 that faces the above region of the optical device bearing surface 23 is greater. In a region which is much closer to the invisible light ray emission sources 30 and which has a larger angle of elevation of the front faces of the invisible light ray emission sources 30, the density of the dots 32 is made lower as the intensity of the infrared radiation reaching the region is smaller and the intensity of the infrared radiation emitted from a region of the light exit surface 22 that faces the above region of the optical device bearing surface 23 is smaller. For example, the dots 32 may be disposed at a density which is inversely proportional to the intensity of the infrared radiation. Alternatively, the density of the dots 32 may generally be calculated according to the following formula (1):

$$\rho = \frac{I_n}{I_0 - \sum_{i=1}^{n} I_i} \quad (1)$$

ρ: the density IO of the dots at a point: the total amount In of light entering the light guide: the amount of light emitted from the light guide (corresponding to the infrared radiation emitted from the backlight) at the point.

The grooves 33 are defined in the form of wavy grooves in the optical device bearing surface 23. The grooves 33 are defined in the optical device bearing surface 23 for causing the visible light rays VL entering from the light entrance surface 21 to exit uniformly from the entire light exit surface 22. For example, the positions, number, and density of the grooves 33 in the optical device bearing surface 23 are calculated based on the intensity of the visible light rays VL that exit from the light exit surface 22.

(Method of Manufacturing the Light Guide)

Figure 4:
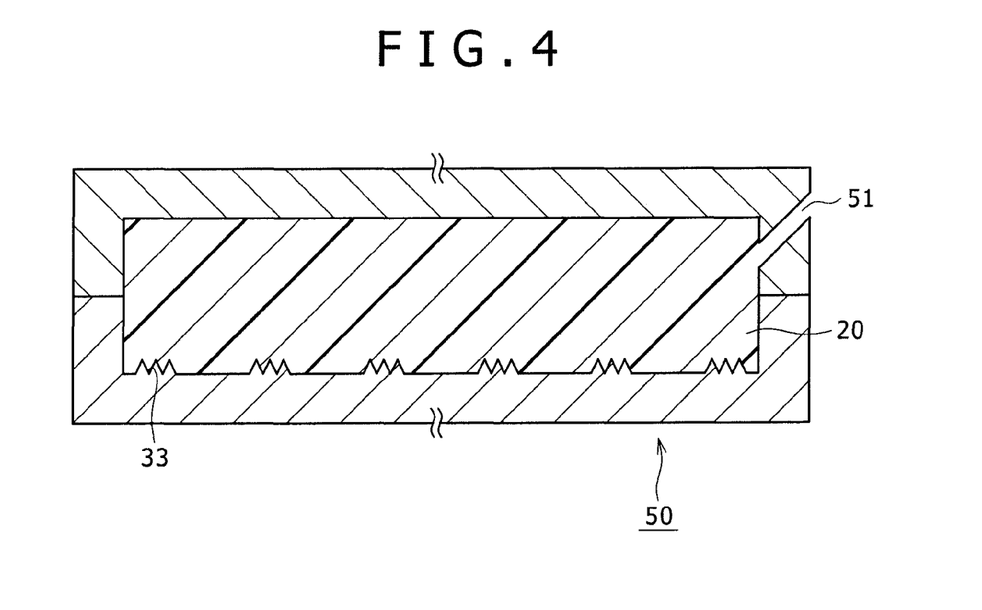
FIG. 4 is a cross-sectional view illustrative of a process of manufacturing a light guide according to the first embodiment.

A method of manufacturing the light guide according to the first embodiment will be described below. FIG. 4 is a cross-sectional view illustrative of a method of manufacturing the light guide according to the first embodiment.

As shown in FIG. 4, a light guide material of polycarbonate resin which is plasticized by being heated to a temperature ranging from about 280° C. to 300° C. is poured into a mold 50 for forming a light guide 20 through a sprue 51 defined in the mold 50. The mold 50 includes ridges for forming the grooves 33, which are complementary in shape to the grooves 33. Then, the mold 50 filled with the light guide material is cooled to solidify the light guide material therein into a light guide 20. At this time, the light guide material in the mold 50 may be pressurized.

Then, the solidified light guide 20 is removed from the mold 50. At this time, the grooves 33 have been formed in the light guide 20.

Ink dots containing the pigment for reflecting the infrared radiation are applied at the density p according to the above formula (1) to the optical device bearing surface 23, thereby printing the dots 32 thereon. In this manner, the light guide 20 with the dots 32 disposed on and the grooves 33 defined in the optical device bearing surface 23 as shown in FIG. 2 is produced.

As described above, after the grooves 33 are formed in the optical device bearing surface 23 by injection molding, the dots 32 are printed on the optical device bearing surface 23.

(Operation)

Figure 5:
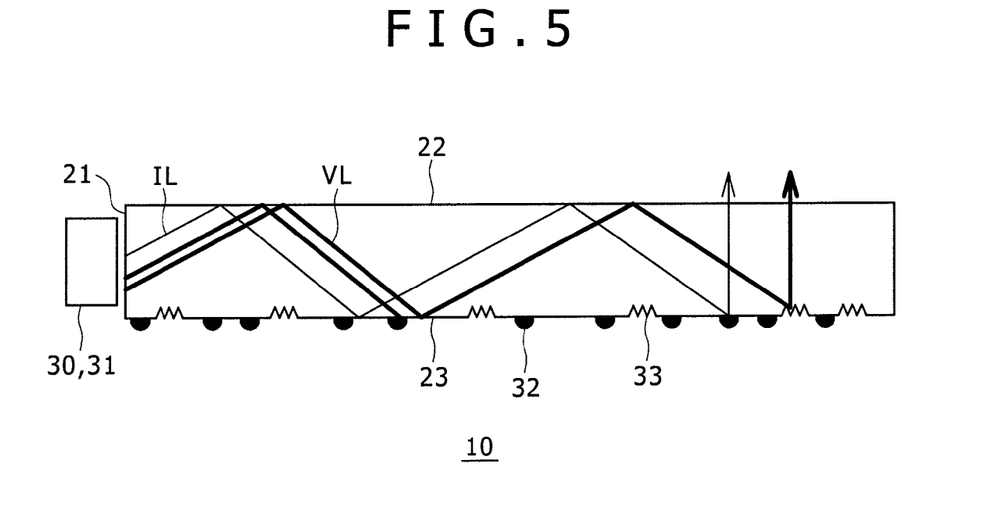
FIG. 5 is a side elevational view illustrative of the manner in which invisible light rays and visible light rays are guided in the light guide according to the first embodiment.

Operation of the surface emission apparatus 10 according to the second embodiment will be described below. FIG. 5 is a side elevational view illustrative of the manner in which the invisible light rays IL and the visible light rays VL are guided in the light guide 10 according to the first embodiment. In FIG. 5, the invisible light rays IL are indicated by thin lines and the visible light rays VL by thick lines.

As shown in FIG. 5, the invisible light rays IL are emitted from the invisible light ray emission sources 30 and enter the light guide 20 from the light entrance surface 21 thereof. In the light guide 20, the invisible light rays IL are repeatedly fully reflected by the light exit surface 22 and the optical device bearing surface 23 while traveling toward a side surface of the light guide 20 which is opposite to the light entrance surface 21. When the invisible light rays IL reach the dots 32 on the optical device bearing surface 23, they are scattered by the dots 32 and directed toward the light exit surface 22. If the incident angle of the invisible light rays IL applied to the light exit surface 22 is greater than the critical angle, then the invisible light rays IL are emitted out of the light guide 20 through the light exit surface 22. The critical angle refers to a smallest angle at which light is fully reflected when the light travels from a medium having a larger refractive index into a medium having a smaller refractive index. If the incident angle of the invisible light rays IL applied to the light exit surface 22 is smaller than the critical angle, then the invisible light rays IL are fully reflected by the light exit surface 22 into the light guide 20, and are guided toward the side surface of the light guide 20 which is opposite to the light entrance surface 21.

As shown in FIG. 5, the visible light rays VL are emitted from the visible light ray emission sources 31 and enter the light guide 20 from the light entrance surface 21 thereof. In the light guide 20, the visible light rays VL are repeatedly fully reflected by the light exit surface 22 and the optical device bearing surface 23 while traveling toward the side surface of the light guide 20 which is opposite to the light entrance surface 21. When the visible light rays VL reach the grooves 33 in the optical device bearing surface 23, they are scattered by the grooves 33 and directed toward the light exit surface 22. If the incident angle of the visible light rays VL applied to the light exit surface 22 is greater than the critical angle, then the visible light rays VL are emitted out of the light guide 20 through to the light exit surface 22. If the incident angle of the visible light rays VL applied to the light exit surface 22 is smaller than the critical angle, then the visible light rays VL are fully reflected by the light exit surface 22 into the light guide 20, and are guided toward the side surface of the light guide 20 which is opposite to the light entrance surface 21.

When the visible light rays VL reach the dots 32 on the optical device bearing surface 23, they are nearly entirely absorbed by the dots 32 because the pigment contained in the dots 32 absorbs the visible light rays VL.

According to the present embodiment, as described above, the dots 32 are densely disposed in the region of the optical device bearing surface 23 where the intensity of the invisible light rays IL emitted from the region of the light exit surface 22 which faces the above region of the optical device bearing surface 23 is smaller and coarsely disposed in the region of the optical device bearing surface 23 where the intensity of the invisible light rays IL emitted from the region of the light exit surface 22 which faces the above region of the optical device bearing surface 23 is greater. Therefore, the dots 32 scatter the invisible light rays IL highly uniformly over the entire optical device bearing surface 23, allowing the invisible light rays IL to be emitted from the light exit surface 22 with a uniformly high intensity in its entirety.

Therefore, when the position of the detectable element is detected by the invisible light rays IL in the display panel of the LCD apparatus which employs the surface emission apparatus 10 according to the present embodiment, the detectable element can be detected with a uniform sensitivity.

Furthermore, since the grooves 33 are defined in the optical device bearing surface 23 based on the intensity of the visible light rays VL, the visible light rays VL are emitted from the light exit surface 22 with a uniformly high intensity in its entirety. As a result, the display panel of the LCD apparatus which employs the surface emission apparatus 10 according to the present embodiment has a uniform level of brightness.

2nd Embodiment (Structure of a Surface Emission Apparatus)

Figure 6:
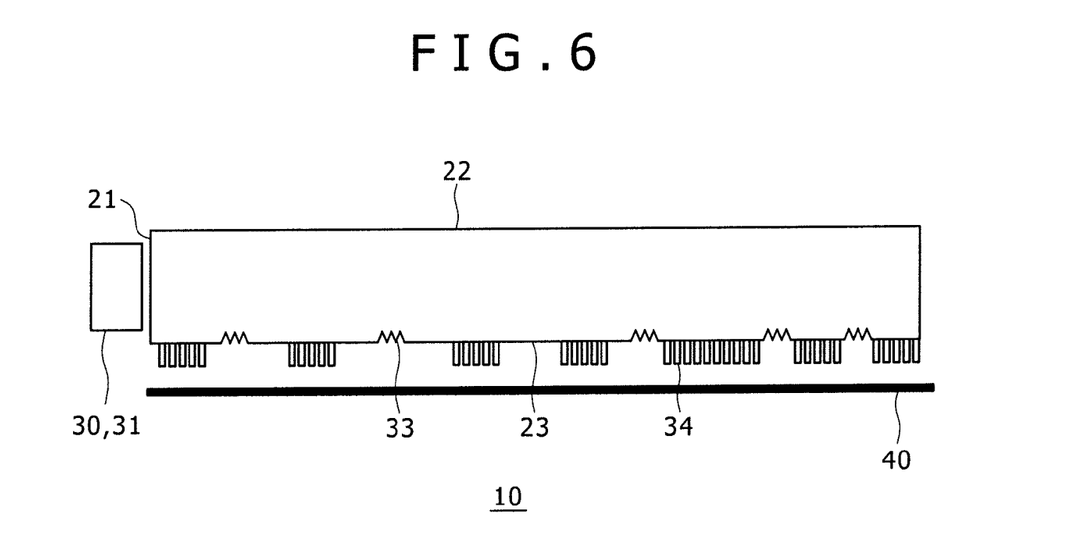
FIG. 6 is a side elevational view of a surface emission apparatus according to a second embodiment of the present invention.

FIG. 6 is a side elevational view of a surface emission apparatus according to a second embodiment of the present invention.

According to the second embodiment, as shown in FIG. 6, a surface emission apparatus 10 according to the second embodiment of the present invention includes a plurality of diffraction gratings 34 instead of the dots 32 and a reflecting plate 40. Other structural details of the surface emission apparatus 10 according to the second embodiment are identical to those of the surface emission apparatus 10 according to the first embodiment, and will not basically be described below.

The diffraction gratings 34, which serve as optical devices according to the present embodiment, scatter invisible light rays IL that reach the diffraction gratings 34 same as the dots 32 according to the first embodiment. The diffraction gratings 34 may be made of a transparent plastic material such as acrylic resin or polycarbonate resin, for example, as with the light guide 20.

Figure 7:
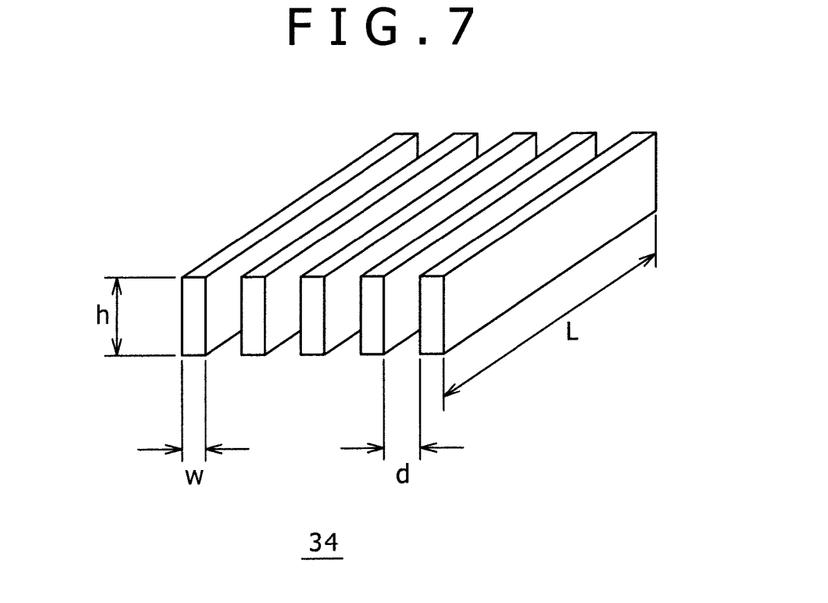
FIG. 7 is a perspective view of a diffraction grating according to the second embodiment.

FIG. 7 is a perspective view of a diffraction grating 34 according to the second embodiment.

If the invisible light rays IL are an infrared radiation (having a wavelength of 850 nm), then the condition of the diffraction grating 34 for emitting the infrared radiation out of the light guide 20 is determined according to the following equation (2):

$$2d \sin \theta = \lambda \tag{2}$$

where d: the interval between adjacent strips or the width of each slit, θ: the incident angle, and λ: the wavelength.

For example, if the light guide 20 is made of polycarbonate resin, then the incident angle for fully reflecting the infrared radiation is 45 degrees, and when the wavelength of the infrared radiation is 850 nm, the distance d between adjacent strips is calculated as about 0.6 μm according to the equation (2). For example, each strip of the diffraction grating 34 has a width w of 0.4 μm and a height h of 1 μm, and the diffraction grating 34 has a length L of 10 μm. If the wavelength of the light scattered by the diffraction grating 34 is not 850 nm, then the condition of the diffraction grating 34 is different from the above condition according to the equation (2).

The diffraction gratings 34 are disposed on the optical device bearing surface 23 for emitting the invisible light rays IL entering from the light entrance surface 21 uniformly from the light exit surface 22 in its entirety. The diffraction gratings 34 serve to scatter more of the invisible light rays IL that have reached the diffraction gratings 34 than the visible light rays VL. For example, the positions, number, and density of the diffraction gratings 34 on the optical device bearing surface 23 are calculated based on the intensity of the invisible light rays IL that are emitted from the light exit surface 22. The diffraction gratings 34 are disposed in the positions for correcting variations in the intensity of the invisible light rays IL emitted from the light exit surface 22. The diffraction gratings 34 have their longitudinal axes extending parallel to the light entrance surface 21.

Figure 8:
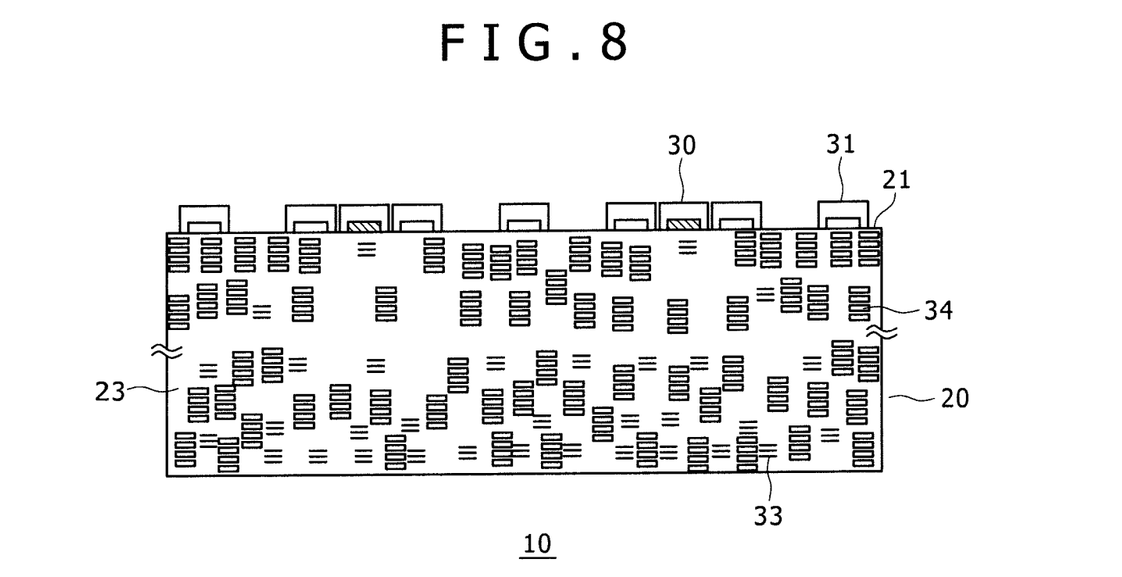
FIG. 8 is a bottom view of the surface emission apparatus according to the second embodiment.

FIG. 8 is a bottom view of the surface emission apparatus 10 according to the second embodiment.

Specifically, according to the present embodiment, as shown in FIG. 8, two invisible light ray emission sources 30 for emitting an infrared radiation as invisible light rays are disposed over the light entrance surface 21 of the light guide 20, and seven visible light ray emission sources 31 for emitting visible light rays are disposed over the light entrance surface 21 of the light guide 20. In a region of the optical device bearing surface 23 which is remoter from the invisible light ray emission sources 30, the density of the diffraction gratings 34 is made higher as the intensity of the infrared radiation reaching the region is smaller and the intensity of the infrared radiation emitted from a region of the light exit surface 22 that faces the above region of the optical device bearing surface 23 is smaller. On the other hand, in a region of the optical device bearing surface 23 which is closer to the front faces of the invisible light ray emission sources 30, the density of the diffraction gratings 34 is made lower as the intensity of the infrared radiation reaching the region is greater and the intensity of the infrared radiation emitted from a region of the light exit surface 22 that faces the above region of the optical device bearing surface 23 is greater. In a region which is much closer to the invisible light ray emission sources 30 and which has a larger angle of elevation of the front faces of the invisible light ray emission sources 30, the density of the diffraction gratings 34 is made higher as the intensity of the infrared radiation reaching the region is smaller and the intensity of the infrared radiation emitted from a region of the light exit surface 22 that faces the above region of the optical device bearing surface 23 is smaller. For example, the diffraction gratings 34 may be disposed at a density which is inversely proportional to the intensity of the infrared radiation. Alternatively, the density of the diffraction gratings 34 may generally be calculated according to the density p based on the above formula (1). With the diffraction gratings 34 thus arranged, the intensity of the infrared radiation emitted from the light exit surface 22 is uniform over the light exit surface 22.

The reflecting plate 40 is spaced from the optical device bearing surface 23 in confronting relation thereto, and lies substantially parallel to the optical device bearing surface 23 on one side thereof remoter from the light exit surface 22. The reflecting plate 40 includes a thin film of glossy metal deposited on a surface of aluminum, gold, silver, or plastic film by evaporation or sputtering. The reflecting plate 40 reflects the invisible light rays IL emitted out of the light guide 20 through the diffraction gratings 34 on the optical device bearing surface 23, back to the light guide 20.

(Method of Manufacturing the Light Guide)

Figure 9:
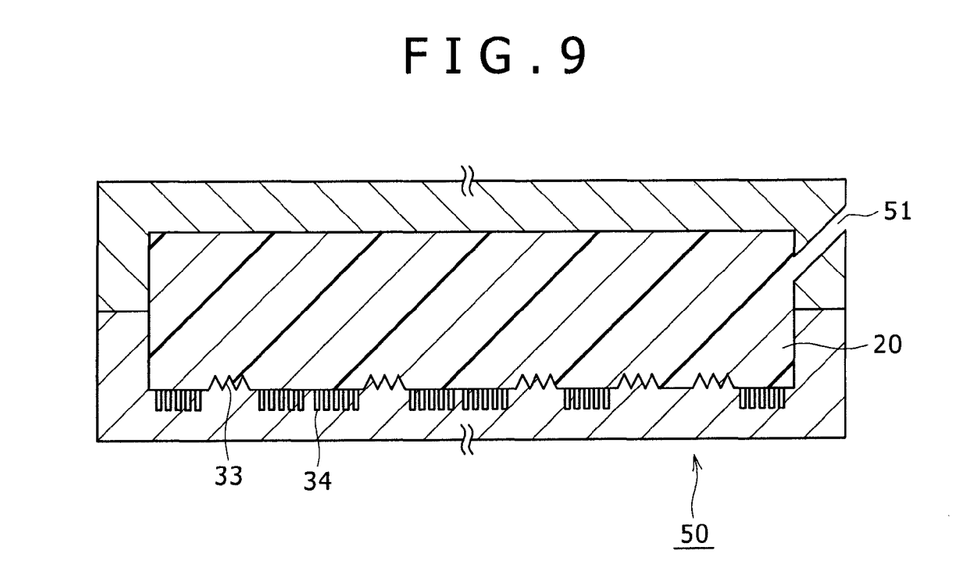
FIG. 9 is a cross-sectional view illustrative of a process of manufacturing a light guide according to the second embodiment.

A method of manufacturing the light guide according to the second embodiment will be described below. FIG. 9 is a cross-sectional view illustrative of a method of manufacturing the light guide according to the second embodiment.

As shown in FIG. 9, a light guide material of polycarbonate resin which is plasticized by being heated to a temperature ranging from about 280° C. to 300° C. is poured into a mold 50 for forming a light guide 20 through a sprue 51 defined in the mold 50. The mold 50 includes ridges for forming the grooves 33, which are complementary in shape to the grooves 33, and grooves for forming the diffraction gratings 34, which are complementary in shape to the diffraction gratings 34.

Then, the mold 50 filled with the light guide material is cooled to solidify the light guide material therein into a light guide 20. At this time, the light guide material in the mold 50 may be pressurized.

Then, the solidified light guide 20 is removed from the mold 50. In this manner, the light guide 20 with the grooves 33 defined in and the diffraction gratings 34 disposed on the optical device bearing surface 23 as shown in FIG. 6 is produced.

As described above, the grooves 33 can be formed in and the diffraction gratings 34 can be formed on the optical device bearing surface 23 at the same time by injection molding.

(Operation)

Figure 10:
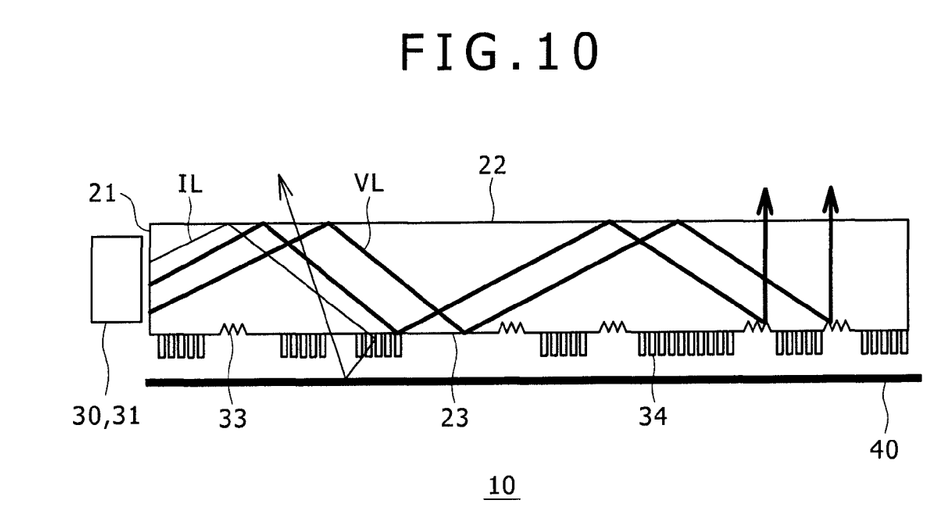
FIG. 10 is a side elevational view illustrative of the manner in which invisible light rays and visible light rays are guided in the light guide according to the second embodiment.

Operation of the surface emission apparatus 10 according to the second embodiment will be described below. FIG. 10 is a side elevational view illustrative of the manner in which the invisible light rays IL and the visible light rays VL are guided in the light guide 10 according to the second embodiment. In FIG. 10, the invisible light rays IL are indicated by thin lines and the visible light rays VL by thick lines.

As shown in FIG. 10, the invisible light rays IL are emitted from the invisible light ray emission sources 30 and enter the light guide 20 from the light entrance surface 21 thereof. In the light guide 20, the invisible light rays IL are repeatedly fully reflected by the light exit surface 22 and the optical device bearing surface 23 while traveling toward a side surface of the light guide 20 which is opposite to the light entrance surface 21. When the invisible light rays IL reach the diffraction gratings 34 on the optical device bearing surface 23, they are emitted out of the light guide 20 through the diffraction gratings 34. The invisible light rays IL emitted out of the light guide 20 are reflected by the reflecting plate 40 and enter the light guide 20 again through the optical device bearing surface 23. If the incident angle of the invisible light rays IL applied to the light exit surface 22 is equal to or greater than the critical angle, then the invisible light rays IL are emitted out of the light guide 20 through the light exit surface 22. If the incident angle of the invisible light rays IL applied to the light exit surface 22 is smaller than the critical angle, then the invisible light rays IL are fully reflected by the light exit surface 22 into the light guide 20, and are guided toward the side surface of the light guide 20 which is opposite to the light entrance surface 21.

As shown in FIG. 10, the visible light rays VL are scattered by the grooves 33 and emitted from the light exit surface 22, as is the case with the first embodiment.

When the visible light rays VL reach the diffraction gratings 34 on the optical device bearing surface 23, the visible light rays VL are not emitted out of the light guide 20 through the diffraction gratings 34, but are fully reflected by the optical device bearing surface 23 because the diffraction gratings 34 are produced under the condition to scatter the infrared radiation. The visible light rays VL are repeatedly fully reflected by the light exit surface 22 and the optical device bearing surface 23 while traveling toward the side surface of the light guide 20 which is opposite to the light entrance surface 21.

According to the present embodiment, as described above, the diffraction gratings 34 are densely disposed in the region of the optical device bearing surface 23 where the intensity of the invisible light rays IL emitted from the region of the light exit surface 22 which faces the above region of the optical device bearing surface 23 is smaller and coarsely disposed in the region of the optical device bearing surface 23 where the intensity of the invisible light rays IL emitted from the region of the light exit surface 22 which faces the above region of the optical device bearing surface 23 is greater. Therefore, the diffraction gratings 34 scatter the invisible light rays IL highly uniformly over the entire optical device bearing surface 23, allowing the invisible light rays IL to be emitted from the light exit surface 22 with a uniformly high intensity in its entirety.

Therefore, when the position of the detectable element is detected by the invisible light rays IL in the display panel of the LCD apparatus which employs the surface emission apparatus 10 according to the present embodiment, the detectable element can be detected with a uniform sensitivity.

The present invention is not limited to the above embodiments, but various changes and modifications may be made to the embodiments.

In the second embodiment, the strips of the diffraction gratings 34 lie parallel to the light entrance surface 21. However, diffraction gratings may be arranged in a different layout as described below.

Figure 11:
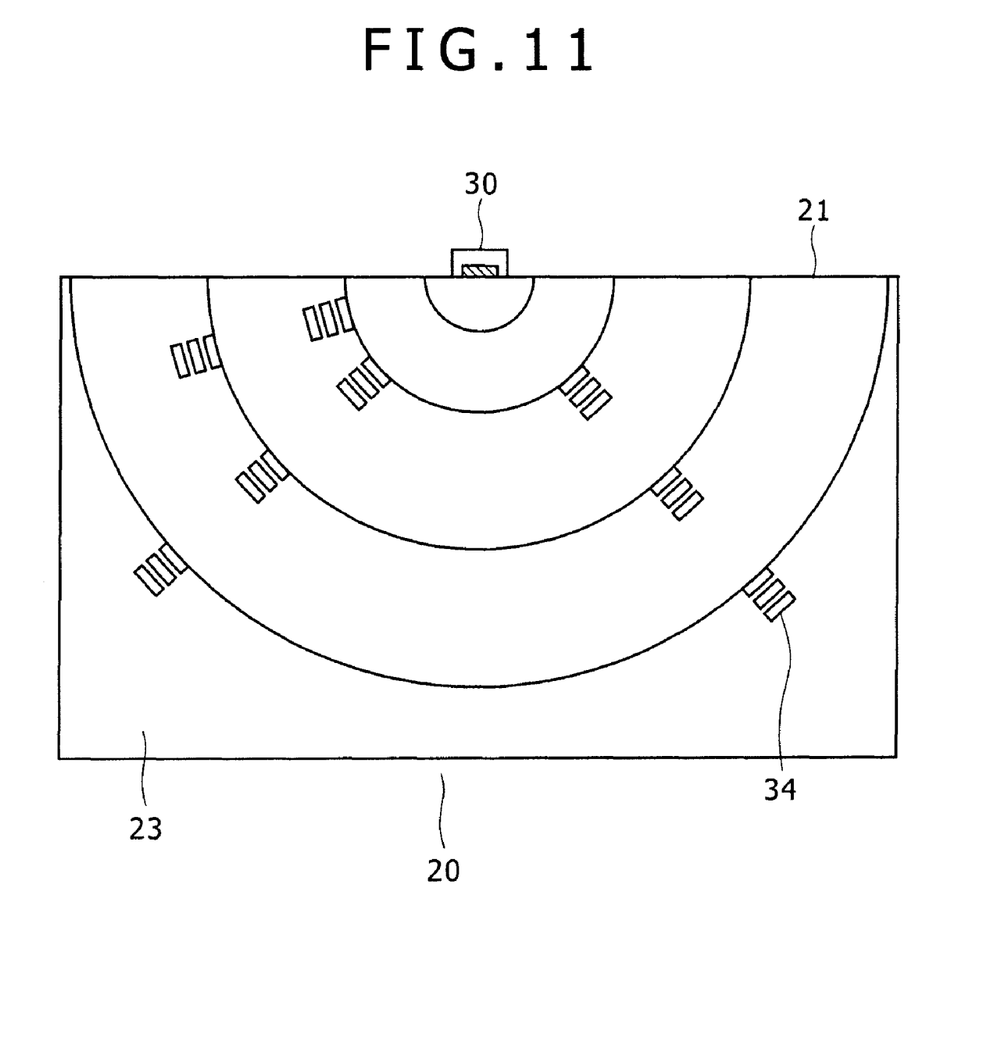
FIG. 11 is a bottom view showing the layout of diffraction gratings according to a third embodiment of the present invention.

FIG. 11 is a bottom view showing the layout of diffraction gratings according to a third embodiment of the present invention.

As shown in FIG. 11, diffraction gratings 34 are disposed on the optical device bearing surface 23 such that the longitudinal axes of the strips of the diffraction gratings 34 are oriented perpendicularly to the direction in which the invisible light rays IL travel through the light guide 20. Specifically, the longitudinal axes of the strips of the diffraction gratings 34 extend parallel to lines that are tangential to concentric circles across which the invisible light rays IL emitted from the invisible light ray emission sources 30 spread radially outwardly. Since the longitudinal axes of the strips of the diffraction gratings 34 are oriented perpendicularly to the direction in which the invisible light rays IL travel through the light guide 20, the invisible light rays IL are more effectively scattered out of the light guide 20.

In the second embodiment, the invisible light ray emission sources 30 and the visible light ray emission sources 31 are disposed adjacent to a side surface, which serves as the light entrance surface 21, of the light guide 20. However, the invisible light ray emission sources 30 and the visible light ray emission sources 31 may be disposed in other positions. For example, they may be disposed adjacent to a rear surface of the light guide 20 or a front surface of the light guide 20.

The invisible light ray emission sources 30 according to the above embodiments correspond to first light sources.

The visible light ray emission sources 31 according to the above embodiments correspond to second light sources.

The dots 32 and the diffraction gratings 34 correspond to optical devices.

Display apparatus which incorporate the surface emission apparatus and the light guide according to the embodiments of the present invention are applicable to various electronic apparatus such as digital cameras, notebook personal computers, portable terminals such as cellular phones, video cameras, etc., which are capable of displaying images based on video signals supplied to or generated in the electronic apparatus.

The above and other features, and advantages of the present invention will become apparent from the following description when taken in conjunction with the accompanying drawings which illustrate preferred embodiments of the present invention by way of example.

What is claimed is:

1. A surface emission apparatus comprising:
   a first light source for primarily or exclusively emitting invisible light rays;
   a second light source for primarily emitting visible light rays;
   a light guide having a light entrance surface for entering therethrough into said light guide the invisible light rays emitted from said first light source and the visible light rays emitted from said second light source, and a light exit surface for emitting the invisible light rays and the visible light rays therethrough out of said light guide; and
   a plurality of optical devices disposed on a surface of said light guide opposite said light exit surface, each of the optical devices having characteristics of reflecting and/or scattering substantially more of invisible light rays incident thereon than visible light rays incident thereon.

2. The surface emission apparatus according to claim 1, wherein said optical devices contain a material for reflecting and/or scattering said invisible light rays and absorbing said visible light rays.

3. The surface emission apparatus according to claim 1, wherein the positions and number of said optical devices are determined based on the intensity of said invisible light rays which are emitted out of said light guide through said light exit surface.

4. The surface emission apparatus according to claim 1, wherein said optical devices are disposed in positions for correcting variations in the intensity of said invisible light rays which are emitted out of said light guide through said light exit surface depending on the layout of said second light source.

5. The surface emission apparatus according to claim 3, wherein said second light source emits an infrared radiation as said invisible light rays.

6. The surface emission apparatus according to claim 5, wherein said optical devices comprise dots containing a pigment for scattering said invisible light rays and absorbing said visible light rays.

7. The surface emission apparatus according to claim 6, wherein said optical devices include diffraction gratings, further comprising:
   a reflecting plate extending parallel to said surface of said light guide on which said optical devices are disposed, and disposed in confronting relation to said surface on which said optical devices are disposed remotely from said light exit surface.

8. The surface emission apparatus according to claim 7, wherein said diffraction gratings include strips having respective longitudinal axes extending perpendicularly to the direction in which said invisible light rays travel in said light guide.

9. The surface emission apparatus according to claim 7, wherein said surface on which said optical devices are disposed has a plurality of grooves defined therein for scattering said visible light rays.

10. The surface emission apparatus according to claim 9, wherein said first light source and said second light source are disposed adjacent to a side surface of said light guide, which serves as said light entrance surface for entering therethrough said invisible light rays and visible light rays.

11. The surface emission apparatus according to claim 10, wherein said first light source and said second light source are electrically independently controllable.

12. A light guide comprising:
a light entrance surface for entering therethrough invisible light rays and visible light rays emitted from respective light sources, the light sources comprised of a plurality of first light sources for primarily or exclusively emitting invisible light rays and a plurality of second light sources for primarily emitting visible light rays;
a light exit surface for emitting the invisible light rays and the visible light rays entering from said light entrance surface, therethrough out of said light guide; and
a plurality of optical devices disposed on a surface opposite said light exit surface, for scattering more of said invisible light rays than said visible light rays, each of the optical devices having characteristics of reflecting and/or scattering substantially more of invisible light rays incident thereon than visible light rays incident thereon.

13. The light guide according to claim 12, wherein the positions and number of said optical devices are determined based on the intensity of said invisible light rays which are emitted out of said light guide through said light exit surface.

14. The light guide according to claim 12, wherein said optical devices are disposed in positions for correcting variations in the intensity of said invisible light rays which are emitted out of said light guide through said light exit surface.

15. The light guide according to claim 13, wherein said optical devices comprise dots containing a pigment for scattering said invisible light rays and absorbing said visible light rays.

16. The light guide according to claim 15, wherein said optical devices comprise diffraction gratings.

17. The light guide according to claim 16, wherein said diffraction gratings include strips having respective longitudinal axes extending perpendicularly to the direction in which said invisible light rays travel in said light guide.

18. The light guide according to claim 17, wherein said surface on which said optical devices are disposed has a plurality of grooves defined therein for scattering said visible light rays.

19. A method of manufacturing a light guide having a light entrance surface for entering therethrough invisible light rays and visible light rays emitted from respective light sources, and a light exit surface for emitting the invisible light rays and the visible light rays therethrough out of said light guide, said method comprising the steps of:
forming grooves for scattering said visible light rays in a surface opposite said light exit surface; and
forming dots containing a pigment for scattering said invisible light rays and absorbing said visible light rays on the surface confronting said light exit surface by printing, each of the dots having characteristics of reflecting and/or scattering substantially more of invisible light rays incident thereon than visible light rays incident thereon.

20. A method of manufacturing a light guide having a light entrance surface for entering therethrough invisible light rays and visible light rays emitted from respective light sources, and a light exit surface for emitting the invisible light rays and the visible light rays therethrough out of said light guide, said method comprising:
forming grooves for scattering said visible light rays in a surface opposite said light exit surface, and diffraction gratings for scattering more of said invisible light rays than said visible light rays incident thereon, each of the diffraction gratings having characteristics of reflecting and/or scattering substantially more of invisible light rays incident thereon than visible light rays incident thereon.

\* \* \* \* \*